Sept. 11, 1951  C. F. WHEELER  2,567,306
AUTOMATIC GATE KEEPER APPARATUS
Filed Oct. 11, 1949  2 Sheets-Sheet 1
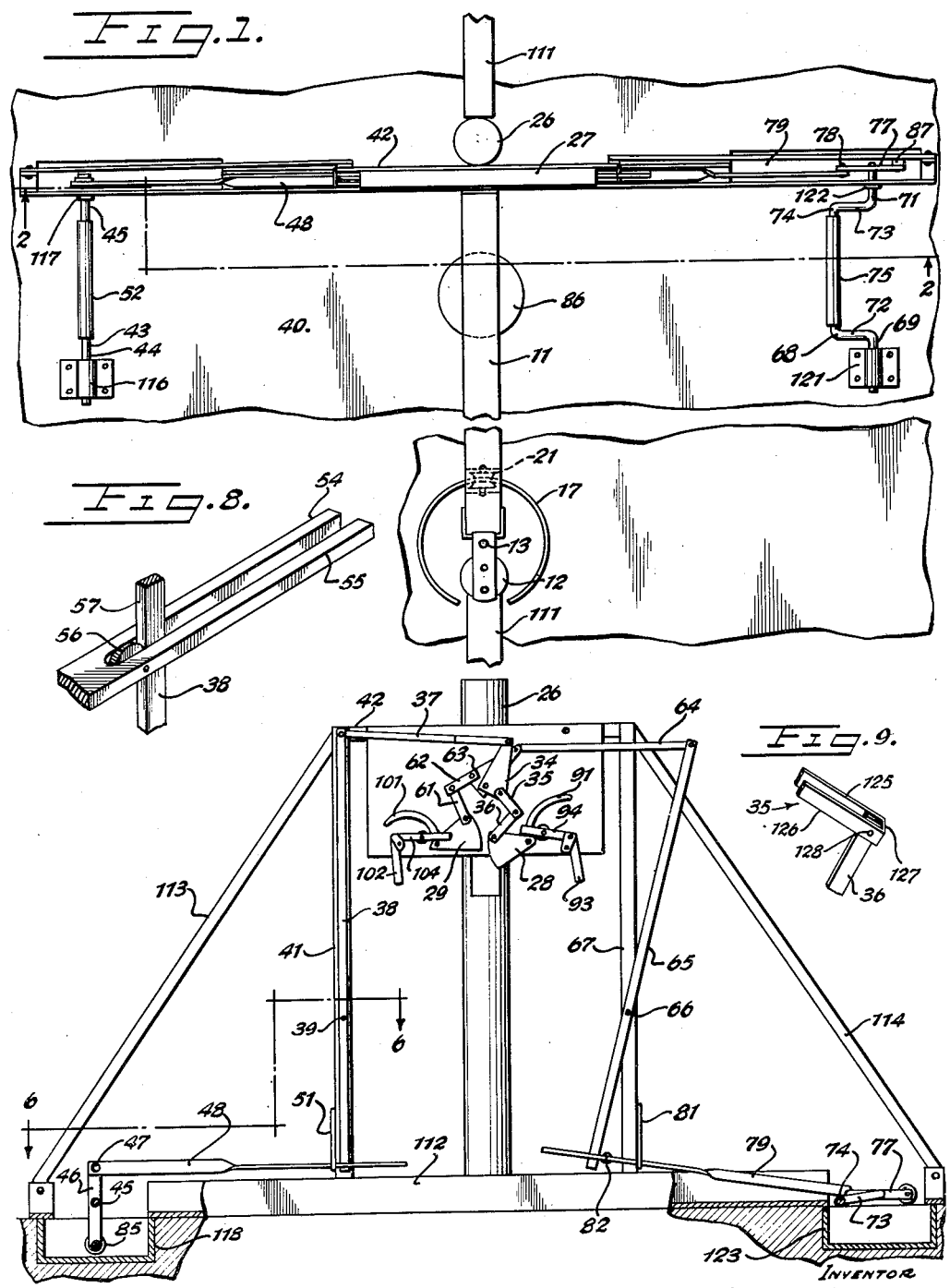
INVENTOR
CARL F. WHEELER.
by Church & Church
ATTORNEYS

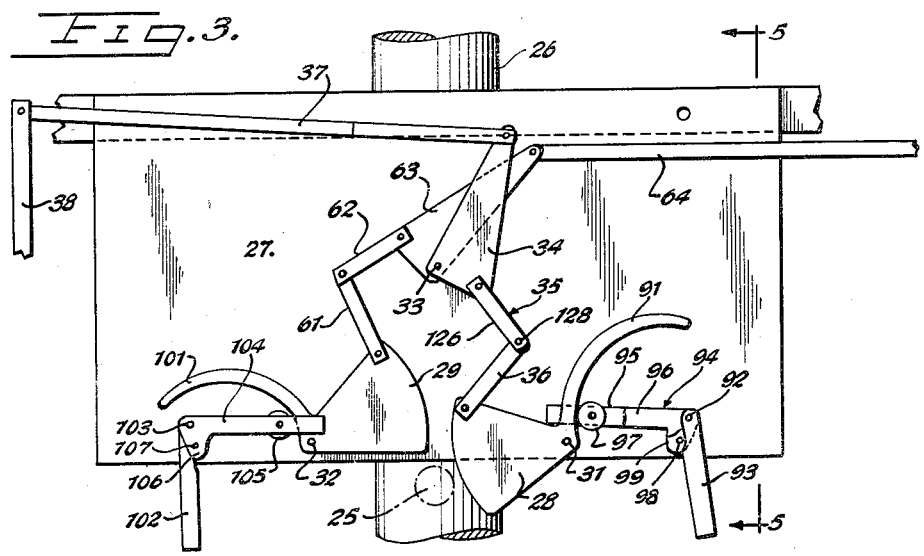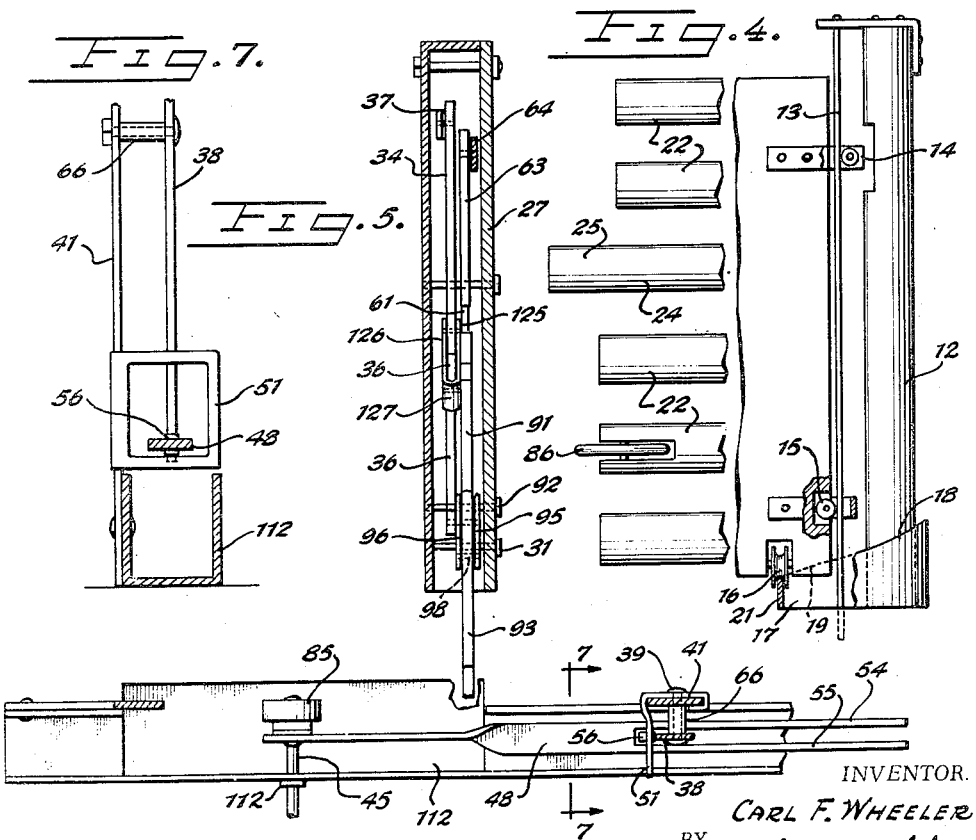

Patented Sept. 11, 1951

2,567,306

UNITED STATES PATENT OFFICE 2,567,306

AUTOMATIC GATE KEEPER APPARATUS

Carl F. Wheeler, Medina, Tex.

Application October 11, 1949, Serial No. 120,799

8 Claims. (Cl. 292—94)

This invention relates to automatically operated gate keeper apparatus for a horizontally swinging gate normally secured in closed position by keepers on each side of its latch, which keepers are automatically released by the approach of a vehicle toward the gate, retained in released positions, and automatically reset by closing movement of the gate.

Gates have been provided with cams on the gatepost so arranged that the force of gravity acting on the gate returns the gate from open to closed position. Gravity operated keepers are well known which lift to permit the gate latch to pass and then fall to retain the gate in closed position. With this arrangement, a gate will automatically close and lock after a vehicle has passed through it. However, it is still necessary for an occupant of the vehicle to manually release the keeper before the gate will open.

Arrangements have heretofore been proposed for automatically releasing the keepers by a treadle or some analogous operating device in the path of an approaching vehicle. However, these prior developments have been too complex, either being too expensive or unable to stand the wear and tear to which they are subjected. Usually the proposed devices incorporate spring operated elements which must be carefully adjusted for proper operation and which soon fail to operate due to change characteristics of the springs with changing weather conditions.

It is a major object of the invention to provide improved automatic gate keeper apparatus of relatively simple construction which may be readily installed and will operate satisfactorily for an indefinite period of time. An important object of the invention is to provide a treadle actuated automatic gate keeper apparatus in which the keeper is retained by gravity in its operative and its inoperative positions. Another object is to provide automatic gate keeper apparatus in which the keeper is shifted from inoperative to operative position by closing movement of the gate.

In accordance with these objects, one important feature of the invention resides in the arrangement of an overbalancing arm in the keeper operating mechanism so it will be acted upon by gravity to retain the keeper in its raised inoperative position. Another feature resides in a one way connection between the treadle and the overbalancing arm so the treadle is effective to shift the lever from vertical to overbalanced position, but is ineffective to shift the lever in the reverse direction.

Another important feature of the invention is embodied in the resetting mechanism which includes a cam connected to the keeper and an operating device actuated by closing movement of the gate to shift the cam to overcome the weight of the overbalancing lever and thereby reset the keeper in operative position. Also, one feature of the invention resides in the arrangement of an arm in the path of the gate latch effective upon closing movement of the gate to actuate the resetting mechanism, but ineffective upon opening movement of the gate.

Other features and objects of the invention will become apparent from the following specification taken in conjunction with the accompanying drawings wherein:

Figure 1 is a partial top plan view of a gate provided with automatic keeper apparatus embodying the invention in its preferred form, the parts being shown operated by a vehicle approaching from the left;

Fig. 2 is a vertical sectional view of the apparatus shown in Fig. 1 and taken on the line 2—2 of Fig. 1, but with the keeper housing uncovered to illustrate the keeper mechanism;

Fig. 3 is an enlarged view of the keeper mechanism as seen in Fig. 2;

Fig. 4 is a fragmentary view of the gate and gatepost, some parts being broken away and others shown in section for purposes of clearness;

Fig. 5 is a vertical sectional view of the keeper mechanism, taken on the line 5—5 of Fig. 3;

Fig. 6 is an enlarged partial horizontal sectional view taken on the line 6—6 of Fig. 2;

Fig. 7 is a cross-sectional view taken on the line 7—7 of Fig. 6;

Fig. 8 is a fragmentary perspective view showing the relative positions of the overbalancing lever and the slide; and Fig. 9 is a fragmentary perspective view of a linkage forming a part of the keeper operating mechanism.

In this preferred form of the invention, a pair of keepers are pivotally mounted, at one side of their centers of gravity, on a keeper housing so they will engage opposite sides of a latch on the unhinged end of the gate. On a pin above these keepers are a pair of tumblers. Linkages connect the tumblers and keepers together so turning of a tumbler about its pivot will raise its connected keeper from an operative position in the path of the gate latch to an inoperative position above the path. On each side of the housing is an overbalancing lever pivoted below its center of gravity and having its upper end connected by a link to one of the tumblers.

Operation of the overbalancing levers to lift the keepers is effected by treadles, one on each side of the gate and each connected by a reciprocable slide to its respective overbalancing lever, the slide being operative to shift the lever upon movement of the treadle in one direction, but being inoperative during reverse movement of the treadle.

Each treadle may shift its associated overbalancing lever from vertical to an overbalanced, angularly disposed position. This moves a tumbler and lifts one of the keepers to inoperative position where it is retained by the overbalanced weight of the lever. To reset the keepers, resetting arms are pivoted on the housing in the path of the gate latch. Each arm operates a lever which engages a cam on its associated keeper to overcome the weight of the overbalancing arm and restore the keeper to operative position. These resetting arms are effective to operate their respective levers only by closing movement of the gate.

In the preferred embodiment of the invention illustrated in the accompanying drawings, a gate 11 is hinged on a gatepost 12 to swing horizontally about the axis of a vertical rod 13 (Fig. 4) supported by the gatepost 12. Attached near the top of gate 11, a roller 14 is arranged on the post side of the rod while a similar roller 15, supported near the bottom of the gate, is arranged on the gate side of the rod 13. The weight of the gate rests upon a wheel 16 which rides on a cam 17 having upwardly inclined surfaces 18 and 19 extending in both directions from a lower central portion 21. With this arrangement, the gate may be opened in either direction so the wheel 16 rides up one of the inclined surfaces of the cam 17. When the gate is released the force of gravity will return the gate to its closed position with the wheel 16 at the lower central portion 21 of the cam 17.

Gate 11 will have a plurality of cross-members 22, 22 (Fig. 4), which may be of tubular material of such strength that they do not require a support at the unhinged end of the gate. One of these cross-members, such as that indicated at 24, may extend beyond the end of the gate to form a latch 25.

Opposite the closed position of the gate 11, as shown in Fig. 1, a keeper post 26 supports a keeper housing 27 which is provided with a pair of keepers 28 and 29, one on each side of the center line of the housing to engage opposite sides of latch 25, as indicated by dot and dash lines in Fig. 3. One of these keepers 28 is shown in its operative position in the path of the latch 25, whereas the other keeper 29 is raised to inoperative position displaced above the path of the latch 25. Each keeper is pivoted at one side of its center of gravity. For example, keeper 28 is pivoted on a pin 31 carried by the walls of housing 27, the greater portion of the weight of the keeper 28 being to the left of the pin 31 as viewed in Fig. 3. Likewise, keeper 29 is pivoted on a pin 32 so the greater portion of its weight is to the right of the pin as viewed in Fig. 3.

Mounted on the housing above the keepers and on the central line between the keepers is a pivot pin 33. Pivoted on this pin is a first tumbler 34 connected by a pair of links 35 and 36 to the upper portion of keeper 28. Tumbler 34 is pivoted so its center of gravity is to the right of the pivot pin 33. A link 37 connects the upper end of the tumbler 34 to the upper end of an overbalancing lever 38 pivoted at 39 below its center of gravity on an upright 41 at one side of the keeper housing 27. To steady the upright 41, its upper end may be connected to housing 27 and post 26 by a crosspiece 42.

It will be noted that the overbalancing lever 38 is arranged on the upright at the side of the housing opposite to the side on which the keeper 28 is pivoted. Operation of keeper 28 through the lever and linkage system described is effected by a treadle 43, of U-shape, having its open ends provided with stub shafts 44 and 45, respectively journaled at the level of roadway 40 to turn about a horizontal axis substantially parallel to the closed position of gate 11. Stub shaft 45 is keyed to a crank 46 having one end pivotally connected at 47 to a lever operating slide 48 supported to reciprocate by an open guide 51 (Fig. 7) upon operation of the treadle 43. To facilitate movement of the treadle 43 by the wheel of a vehicle approaching the gate, a sleeve 52 is rotatable on the wheel-engaging portion of the treadle.

Operating slide 48 has one end pivoted at 47 to crank 46 and its other end bifurcated with legs 54 and 55 extending on opposite sides of the lever 38. Positioned between the legs 54 and 55 and journaled therein is a roller 56 arranged to engage side surface 57 of the lower end of lever 38. Thus, reciprocating slide 48 is effective to move lever 38 upon movement of the treadle 43 and crank 46 in a clockwise direction as viewed in Fig. 2, but is ineffective to operate the lever upon movement of the treadle and crank in the opposite direction.

Operating connections of the keeper 29 are similar. A pair of links 61 and 62, pivotally connected together, have their free ends respectively connected to the upper end of the keeper 29 and one side of tumbler 63 also pivoted on pin 33. At its upper end, the tumbler 63 is connected by a link 64 to an overbalancing lever 65 pivoted below its center of gravity at 66 on an upright 67 arranged on the side of the post 26 opposite to the upright 41. Operation of the overbalancing lever 65 is effected by a treadle 68 having its stub shafts 69 and 71 journaled at ground level to turn about an axis parallel to the closed position of the gate 11 parallel to the axis of treadle 43. As illustrated in Fig. 1, treadle 68 is also of U-shape having legs 72 and 73 extending from stub shafts 69 and 71 to a crosspiece 74 on which is rotatable a sleeve 75. A crank 77 keyed to the stub shaft 71 is pivotally connected at 78 to one end of a reciprocating slide 79. An open guide 81, like the guide 51, supports the slide 79 to reciprocate upon operation of the treadle and crank 77. The other end of slide 79 is bifurcated in the same fashion as slide 48. Between the legs forming the bifurcated end of the slide 79 there is journaled a roller 82 for engaging the side surface of overbalancing lever 65 so the slide 79 is effective to move the overbalancing lever 65 only when the treadle 68 and crank 77 are moved in a counterclockwise direction, as viewed in Fig. 2.

Keeper 28 is shown in its operative position. Treadle 43 is, likewise, shown in its neutral position awaiting operation by an approaching vehicle. The other treadle 68 is shown in the position it assumes upon being depressed by the wheel of a vehicle approaching the gate from the right-hand side of Figs. 1 and 2. The operating mechanism and keeper 29 are shown in the positions to which they are shifted by depressing the treadle. In operation, when a vehicle engages one of the treadles, such as treadle 43, it causes turning movement of the associated crank and reciprocation of slide 48 so its roller 56 engages and shifts the lower end of overbalancing lever 38. Thus, overbalancing lever 38 is shifted from its balanced vertical position to an overbalanced position angularly disposed with respect to the vehicle. This movement of the lever 38 acts through link 37 to turn tumbler 34 in a counterclockwise direction, as viewed in Figs. 2 and 3. This turning movement of tumbler 34 is effective through links 35 and 36 to raise the keeper 28 from its operative position to an inoperative position above the path of latch 25. After the vehicle has passed over the treadle 43, a counterbalancing weight 85 on the crank 46 returns the treadle to its upright position thereby shifting the reciprocating slide 48 in a reverse direction. However, this movement of the slide 48 is ineffective on the overbalancing lever 38. Keeper 28 is retained in its raised inoperative position by the over-balanced weight of lever 38. This is best illustrated by the arrangement of the operating mechanism for keeper 29. After a vehicle has passed over treadle 68, the treadle will return to its raised position and will return slide 79 to its original position, but overbalancing lever 65 will be retained by gravity in the position shown in Fig. 2, thereby retaining the keeper 29 in its raised inoperative position. The purpose of this arrangement is to retain the keeper in operative position after the vehicle passes over the treadle so the vehicle may continue until it engages a rotatable rubber bumper 86 and pushes the gate open. Thus, a vehicle approaching from the right of Fig. 1 could pass over the treadle 68 permitting the treadle to be returned to its raised position by counterweight 87, with the keeper 29 remaining in operative position so the vehicle might open the gate and continue through the gate and beyond.

Resetting of the keepers in their lower operative positions is effected by closing movement of the gate. For this purpose each keeper has a cam. For example, keeper 28 has an arcuate shaped cam 91 formed as an integral part of the keeper and extending in a direction away from the upper side of the keeper adjacent its pivot 31. Depending from a pivot pin 92, on the housing 27 adjacent the keeper, is a resetting arm 93 positioned in the path of the gate latch 25 so it will be engaged by the gate latch and swung about the pivot 92 during opening and closing movements of the gate. Also, pivoted on the housing 27 adjacent the resetting arm 93 is a lever 94. One convenient way of mounting the lever 94 is to pivot it on the pin 92 along with resetting arm 93. Lever 94 is preferably formed of two parallel legs 95 and 96 between which is journaled a cam operating roller 97. As it is desired to have resetting arm 93 operate lever 94 only during closing movements of the gate, a connection provided between the arm and the lever which is effective only when the arm is moved in a clockwise direction, as viewed in Fig. 3, which movement is caused by gate latch 25 passing the arm 93 as the gate moves toward closed position. This connection may be in the form of an abutment pin 98 on an ear 99 of the lever 94 and arranged to engage one side of the resetting arm 93 so the arm may be moved freely in a counterclockwise direction, as viewed in Fig. 3, without moving the lever 94.

Similarly, keeper 29 is provided with a cam 101 of arcuate shape extending away from the keeper adjacent its pivot 32. A resetting arm 102 depends from pivot 103 on the housing 27 into the path of movement of the gate latch 25. Also, pivoted on pin 103 is a cam lever 104, having journaled in its free end a cam-engaging roller 105. Ear 106 on the lever 104 carries an abutment pin 107 to be engaged by the resetting arm 102 upon movement in a counterclockwise direction, as viewed in Fig. 3, but ineffective upon movement of the resetting arm in the opposite direction. The cam operating levers 94 and 104 with their rollers 97 and 105 are so positioned, and the cams 91 and 101 are so shaped that turning of the levers causes the cam rollers to traverse the cams and move them in a direction to overcome the overbalanced weight of the levers 41 and 65, and thereby return the keepers from their raised inoperative position to their respective operative positions in the path of the gate latch 25.

To install this apparatus, gateposts 12 and 26 are positioned on each side of an opening in fence 111. A base for the keeper housing and associated mechanism may be provided by a channel 112 extending parallel to the roadway in both directions from the post 26. Uprights 41 and 67 may be secured to this base and reinforced by angularly disposed structural members 113 and 114 extending from the ends of the channel 112 to the top of the uprights. A bearing 116 may be secured to a concrete emplacement positioned flush with or slightly below the roadway to rotatably support stub shaft 44 on the treadle 43. Stub shaft 45 may be journaled in a bearing 117 on a side of the channel 112 so the stub shaft extends through the channel to support crank 46. A concrete housing 118 is provided below the end portion of channel 112 to accommodate the lower part of crank 46 with its counterweight 85. Similarly, the other end of the mechanism may be provided with a bearing 121 for stub shaft 69 of the treadle 68, stub shaft 71 being journaled in bearing 122 on the side of channel 112. A concrete housing 123 is provided below the other end portion of channel 112 to accommodate crank 77 and counterweight 87.

With the mechanism thus installed, and the gate in closed position with both keepers in operative position, a vehicle approaching from the right of the apparatus, as seen in Fig. 1, will depress treadle 68 to reciprocate slide 79 and displace overbalancing lever 65 from its vertical position to its overbalanced position, as shown in Fig. 2. This movement of the lever 65 operates through link 64, tumbler 63 and links 62 and 61 to raise keeper 29 from its operative position to its inoperative position, as shown in Fig. 2. The vehicle may then proceed toward the gate releasing treadle 68 so it can return to its raised position without disturbing the position of overbalancing lever 65 or the keeper 29. After the gate is forced open by engagement of the vehicle with rubber bumper 86, the vehicle can proceed through the gate which will then swing by gravity toward closed position. In opening, the gate latch 25 moves resetting arm 102 in a clockwise direction, as seen in Figs. 2 and 3, but this does not move the lever 104. However, in returning toward closed position, gate latch 25 again engages resetting arm 102 but moves it in a counterclockwise direction, as seen in Figs. 2 and 3, whereupon arm 102 engages abutment pin 107 to shift the lever 104 in a counterclockwise direction. Upon being raised to its inoperative position keeper 29 has its cam 101 moved toward the lever 104. In this position, counterclockwise movement of the lever 104 causes cam roller 105 to traverse the arc of cam 101, thereby moving the keeper 29 to overcome the weight of overbalancing lever 65 and restore the keeper to its operative position.

Similarly, a vehicle approaching from the opposite direction will depress treadle 43 to reciprocate slide 48 and shift overbalancing lever 41 from its vertical position to an angularly disposed overbalanced position. This operates through link 37, tumbler 34 and links 35 and 36 to raise keeper 28 from its operative position, as shown in Figs. 2 and 3, to an inoperative position where it is held by the overbalanced weight of lever 41 even though treadle 43 is released and slide 48 returns to its original position. In opening the gate away from the treadle 43, gate latch 25 moves arm 93 but does not operate lever 94. Closing movement of the gate again operates arm 93 which turns lever 94 so cam roller 97 transverses cam 91 to overcome the weight of overbalancing lever 41 and return the keeper 28 to its operative position. As illustrated in Fig. 9, link 35 is composed of a pair of spaced arms 125 and 126 on each side of link 36. An end piece 127 joins the sides 125 and 126 so it engages the edge of link 36, pivot pin 128 extending between the sides 125 and 126 to connect links 35 and 36 adjacent the end piece 127. The purpose of this arrangement is to limit the downward movement of link 36 with respect to link 35 so the links exert an upward force on keeper 28 when tumbler 34 is operated, but does not limit upward movement of keeper 28 independently of movement of the tumbler 34. In case the gate is open and the keeper 28 is in operative position, the gate may close and gate latch 25 will elevate the keeper sufficiently to permit the gate latch to assume its central position between the two keepers. Following such elevation by the gate latch 25 keeper 28 will return by gravity to its operative position. Links 61 and 62 are similarly constructed to permit upward movement of keeper 29 independently of movement of the tumbler 63 but provide a connection whereby keeper 29 will be positively lifted when tumbler 63 is turned.

From the foregoing it will be apparent that all parts of the automatic keeper apparatus are gravity operated or, operated by an external force against gravity. This eliminates the need for any spring actuated devices and the difficulties involved in the use of such devices. Once the keeper operating mechanism is installed, it requires practically no maintenance other than an occasional drop of oil on the moving parts. Inclement weather conditions will not adversely affect the operation of the mechanism.

What is claimed is:

1. Automatic gate keeper apparatus comprising a keeper mounted on a pivot at one side of its center of gravity and shiftable between an operative position and a raised inoperative position, means connected to said keeper for shifting said keeper from operative to inoperative position, and overbalancing lever pivoted below its center of gravity connected to said means, said overbalancing lever being turnable on its pivot from a normally vertical position when said keeper is in operative position to an angularly disposed position when said keeper is raised to inoperative position, the overbalanced weight of said lever being sufficient to retain said keeper in inoperative position, a treadle operated crank, and a slide connected to said crank for moving said lever from vertical to overbalanced position.

2. Automatic gate keeper apparatus comprising a housing, a keeper pivoted at one side of its center of gravity on said housing and shiftable between an operative position and a raised inoperative position, a tumbler pivoted on said housing above said keeper, linkage connecting said keeper to said tumbler, an overbalancing lever pivotally mounted below its center of gravity at one side of said housing, a treadle operated crank for shifting said lever from a vertically disposed position to an overbalanced angularly disposed position, and a link connected between said lever and said tumbler.

3. Automatic gate keeper apparatus comprising a housing, a keeper pivoted at one side of its center of gravity on said housing and shiftable between an operative position and a raised inoperative position, a tumbler pivoted on said housing above said keeper, linkage connecting said keeper to said tumbler, an overbalancing lever pivotally mounted below its center of gravity at one side of said housing and connected to said tumbler, a treadle operated crank, a slide having one end connected to said crank, and an abutment on said slide engageable with said lever upon operation of said crank to shift said lever from vertical to overbalanced position.

4. In automatic keeper apparatus, a keeper operating device comprising an overbalancing lever pivoted below its center of gravity, means connecting said lever to the keeper, said lever being movable about its pivot between a vertical position and an overbalanced position angularly disposed with respect to said vertical position, a treadle operated crank, a reciprocable slide pivotally connected to said crank, and an abutment positioned on said slide to engage and shift said lever from its vertical position to its overbalanced position upon reciprocation of said slide in one direction by operation of said crank, said abutment being ineffective to shift said lever upon reciprocation of said slide in the opposite direction.

5. In automatic keeper apparatus, a keeper operating device comprising an overbalancing lever pivoted below its center of gravity, means connecting said lever to the keeper, said lever being movable about its pivot between a vertical position and an overbalanced position angularly disposed with respect to said vertical position, a treadle operated crank, and a reciprocable slide having a bifurcated end and pivotally connected at its other end to said crank, said overbalancing lever having its lower end between the sides of the bifurcated end of said slide.

6. In automatic gate keeper apparatus having a pivoted keeper, a keeper resetting device comprising a cam connected to the keeper, a lever, a cam operator carried by said lever, said cam being shaped and arranged to shift the keeper from inoperative to operative position upon movement of said cam operator, an arm depending from a pivot adjacent said lever, and means operative by movement of said arm in one direction for moving said lever and cam operator, but inoperative to move them during movement of said arm in the opposite direction.

7. In automatic gate keeper apparatus having a pivoted keeper, keeper resetting apparatus comprising a cam connected to the keeper, a lever, a cam operator on said lever for moving said cam, said cam being shaped and arranged to move the keeper from inoperative to operative position upon being moved by said cam operator, an arm depending from a pivot adjacent said lever, and an abutment on said lever in the path of movement of said arm about its pivot.

8. Automatic gate keeper apparatus comprising a housing, a pair of keepers pivoted at spaced points on opposite sides of the center of said housing to retain a gate latch between them, each keeper being pivoted at one side of its center of gravity so it is normally urged by gravity toward an operative position, a pivot pin on said housing above said keepers, a pair of independently shiftable tumblers pivoted on said pin, linkage connecting one tumbler to one keeper, linkage connecting the other tumbler to the other keeper, a first normally vertically disposed overbalancing lever pivotally supported below its center of gravity adjacent the side of said housing on which said one keeper is pivoted, a link connecting the upper end of said first overbalancing lever to said other tumbler, a second normally vertically disposed overbalancing lever pivotally supported below its center of gravity adjacent the side of said housing on which said other keeper is pivoted, a link connecting the upper end of said second overbalancing lever to said one tumbler, a pair of treadles, slide connections between said treadles and said overbalancing levers operative upon operation of said treadles toward the gate to shift the respective overbalancing levers from their normally vertical positions to lift the respective tumblers and keepers to inoperative positions above their operative positions, the weight of said overbalancing levers being sufficient to retain said tumblers and keepers in their raised inoperative positions, a pair of keeper resetting arms pivoted on said housing, one adjacent each of said keepers, a pair of cam levers pivoted on said housing, one operatively connected to each of said keeper resetting arms, each of said keepers having a cam thereon of arcuate shape, and a cam operator on each of said cam levers arranged to engage the respective cams upon operation of said keeper resetting arms, to overcome the overbalanced weight of said overbalancing levers and to return the respective keepers to their operative positions.

CARL F. WHEELER.

REFERENCES CITED

The following references are of record in the file of this patent:

UNITED STATES PATENTS

| Number | Name | Date |
|---|---|---|
| 462,981 | Mace | Nov. 10, 1891 |
| 784,510 | Arke | Mar. 7, 1905 |
| 1,245,057 | Stillings et al. | Oct. 30, 1917 |
| 1,545,285 | Speer | July 7, 1925 |
| 1,648,691 | Mathews | Nov. 8, 1927 |
| 2,343,519 | Balch | Mar. 17, 1944 |
| 2,396,610 | Schulze | Mar. 17, 1946 |